US009956947B2

(12) United States Patent
Nishikawa et al.

(10) Patent No.: US 9,956,947 B2
(45) Date of Patent: May 1, 2018

(54) ELECTRIC BRAKE DEVICE

(71) Applicant: NTN CORPORATION, Osaka (JP)

(72) Inventors: Akiyoshi Nishikawa, Iwata (JP); Yui Masuda, Iwata (JP)

(73) Assignee: NTN CORPORATION, Osaka (JP)

( * ) Notice: Subject to any disclaimer, the term of this patent is extended or adjusted under 35 U.S.C. 154(b) by 15 days.

(21) Appl. No.: 15/146,521

(22) Filed: May 4, 2016

(65) Prior Publication Data
US 2016/0244042 A1 Aug. 25, 2016

Related U.S. Application Data

(63) Continuation of application No. PCT/JP2014/079408, filed on Nov. 6, 2014.

(30) Foreign Application Priority Data

Nov. 19, 2013 (JP) .................................. 2013-238690

(51) Int. Cl.
*B60T 17/22* (2006.01)
*B60T 8/90* (2006.01)
(Continued)

(52) U.S. Cl.
CPC .............. *B60T 17/221* (2013.01); *B60T 8/90* (2013.01); *B60T 13/741* (2013.01);
(Continued)

(58) Field of Classification Search
CPC ........ B60T 17/221; B60T 8/90; B60T 13/741; F16D 55/226; F16D 65/18; F16D 2121/24; F16D 2125/40; F16D 2125/48
See application file for complete search history.

(56) References Cited

U.S. PATENT DOCUMENTS 6,158,822 A * 12/2000 Shirai ................... B60T 13/741
188/1.11 L
7,673,949 B2 3/2010 Kuramochi et al.
(Continued)

FOREIGN PATENT DOCUMENTS

JP 8-127332 5/1996
JP 2002-58288 2/2002
(Continued)

OTHER PUBLICATIONS

International Search Report dated Feb. 10, 2015, in corresponding International Application No. PCT/JP2014/079408.
(Continued)

*Primary Examiner* — Todd Melton (57) ABSTRACT

An electric brake device is provided which is capable of early detecting presence/absence of abnormality in the brake device during the traveling of a vehicle in the absence of the operation of a brake application device. A controller includes an abnormality detecting operation controller which operates the electric motor according to a predetermined condition during the traveling of the vehicle in the absence of the operation of the brake application device. The device further includes an abnormality detector which obtains a measured value of a predetermined item related to the vehicle when the electric motor is operated by the abnormality detecting operation controller, and compares the measured value with an estimated value or a set value to detect presence/absence of abnormality in the brake device.

11 Claims, 6 Drawing Sheets

(51) Int. Cl.
  *B60T 13/74* (2006.01)
  *F16D 55/226* (2006.01)
  *F16D 65/18* (2006.01)
  F16D 121/24 (2012.01)
  F16D 125/40 (2012.01)
  F16D 125/48 (2012.01)

(52) U.S. Cl.
  CPC ........... *F16D 55/226* (2013.01); *F16D 65/18* (2013.01); *F16D 2121/24* (2013.01); *F16D 2125/40* (2013.01); *F16D 2125/48* (2013.01)

(56) References Cited

U.S. PATENT DOCUMENTS

| | | | |
|---|---|---|---|
| 9,550,503 B2* | 1/2017 | Elstorpff | ............... B60T 8/1705 |
| 2006/0163939 A1 | 7/2006 | Kuramochi et al. | |
| 2014/0196994 A1* | 7/2014 | Schneider | ............. B60T 13/588 188/152 |
| 2014/0222258 A1 | 8/2014 | Elstorpff et al. | |

FOREIGN PATENT DOCUMENTS

| | | |
|---|---|---|
| JP | 2004-359169 | 12/2004 |
| JP | 2006-232259 | 9/2006 |
| JP | 2007-15469 | 1/2007 |
| JP | 5000893 | 8/2012 |
| WO | WO 2009/013172 A1 | 1/2009 |
| WO | WO 2013/034735 A2 | 3/2013 |

OTHER PUBLICATIONS

International Preliminary Report on Patentability dated Jun. 2, 2016 in corresponding International Patent Application No. PCT/JP2014/079408.
Chinese Office Action dated Nov. 3, 2017 in related Chinese Application No. 201480062542.
Japanese Notification of Reason(s) for Rejection dated Oct. 3, 2017 in related Japanese Application No. 2013-238690.
Extended European Search Report dated Jul. 24, 2017 in corresponding European Patent Application No. 14863817.4.

* cited by examiner

ELECTRIC BRAKE DEVICE

CROSS REFERENCE TO THE RELATED APPLICATION

This application is a continuation application, under 35 U.S.C. § 111(a), of international application No. PCT/JP2014/079408, filed Nov. 6, 2014, which claims Convention priority to Japanese patent application No. 2013-238690, filed Nov. 19, 2013, the entire disclosure of which is herein incorporated by reference as a part of this application.

BACKGROUND OF THE INVENTION

Field of the Invention

The present invention relates to an electric brake device, and to a technique for early detecting abnormality in the electric brake device.

Description of Related Art

In a vehicle having an electric brake mounted therein, when abnormality occurs in an electric brake device for a certain wheel, a braking distance may undesirably increase due to a reduction in a braking force. Therefore, it is necessary to promptly notify a driver of occurrence of the abnormality in the electric brake device.

Patent Document 1 discloses an electric brake device in which necessary power is supplied when abnormality occurs in a power supply system. This electric brake device is based on an assumption that malfunction of a power supply can be detected, and relates to a technique for switching a power supply route in accordance with a failed or disconnected path.

There are documents (Patent Documents 2 and 3) which disclose a technique for performing an operation check before a vehicle starts to travel or when a parking brake is actuated. Further, there is a document (Patent Document 4) which discloses a technique for executing detection of disconnection simultaneously with actuation of an electric brake.

RELATED DOCUMENT

Patent Document

[Patent Document 1] JP Laid-open Patent Publication No. 2004-359169
[Patent Document 2] JP Laid-open Patent Publication No. 2006-232259
[Patent Document 3] JP Patent No. 5000893
[Patent Document 4] JP Laid-open Patent Publication No. 2002-58288

SUMMARY OF THE INVENTION

In an electric brake device in which a brake pressing member is pressed against a brake rotor through an operation of an electric actuator, for example, a vehicle integrated control device or a driver needs to perform a functional diagnosis for the electric brake device in order to detect and recognize brake abnormality.

For example, abnormality such as malfunction of a power supply can be detected relatively easily. Abnormality such as complete disconnection of a harness, isolation of a connector or the like, or damage due to excess current can be easily detected at the point in time when the abnormality occurs.

On the other hand, partial disconnection of a harness or a power distribution path, abnormalities of various sensors, falling of a rotor magnet of a motor which is an electric actuator, or the like may occur even in the absence of the operation of the electric brake device, because of a load caused by repetition of vibration or shock, or aging deterioration. Since it is difficult to detect such abnormality in the absence of the operation of the electric brake device is not operated, the abnormality may be detected for the first time when the driver applies a brake.

In the case where abnormality cannot be detected unless the electric brake is actuated, for example, the longer the situation that the vehicle travels without using the brake for a long period of time, such as traveling on a highway, continues, the higher the possibility is that abnormality occurs in the electric brake device when braking is started at the next time.

An object of the present invention is to provide an electric brake device capable of early detecting presence/absence of abnormality in the electric brake device, during the traveling of the vehicle in the absence of the operation of a brake application device.

Hereinafter, in order to facilitate the understanding, the present invention will be described with reference to the reference numerals used in embodiments for convenience sake.

An electric brake device according to one aspect of the present invention includes: a brake rotor 6; a pressing member 7; an electric actuator 2 configured to press the pressing member 7 against the brake rotor 6; and a control device 9 configured to control the electric actuator 2. The control device 9 includes: a basic control module 36*a* configured to activate or operate the electric actuator 2 in response to an operation performed on a brake application device 40 by a driver, so that the pressing member 7 is pressed against the brake rotor 6 to apply a braking force to the brake rotor 6; an abnormality detecting operation control module 36*b* configured to activate or operate the electric actuator 2 according to a predetermined condition during the traveling of a vehicle in the absence of the operation of the brake application device 40; and an abnormality detection module 37 configured to obtain a measured value of a predetermined item related to the vehicle when the electric actuator 2 is activated or operated by the abnormality detecting operation control module 36*b*, and to compare the measured value with an estimated value or a set value to detect presence/absence of abnormality in the electric brake device.

The "predetermined condition" is, for example, a condition that causes the electric actuator 2 to activate or operate such that a braking force is obtained which generates a deceleration equal to or less than a certain ratio (e.g., 10%) with respect to a deceleration of the vehicle.

The "measured value of a predetermined item related to the vehicle" is, for example, an actual pressing force of the pressing member 7 when the electric actuator 2 is activated or operated.

The "estimated value" or the "set value" is, for example, a pressing force of the pressing member 7 estimated from a rotation angle of the electric actuator 2, a generated torque, or the like, when the electric actuator 2 is activated or operated.

According to this configuration, when the electric actuator 2 is activated or operated by the abnormality detecting operation control module 36*b*, the abnormality detection module 37, for examples, detects the actual pressing force of the pressing member 7, compares the actual pressing force with the estimated pressing force, and detects presence/absence of abnormality in the electric brake device on the basis of the comparison result.

As described above, during the traveling of the vehicle in the absence of the operation of the brake application device 40 by the driver, it is possible to detect presence/absence of abnormality in the electric brake device. Therefore, under the situation that the vehicle travels without using the brake for a long period of time, such as driving on a highway, it is possible to early detect presence/absence of abnormality in the electric brake device. When abnormality of the electric brake device is detected, the driver can take an appropriate countermeasure, such as moving the vehicle to a place where the vehicle does not obstruct the traffic of other vehicles and then stopping the vehicle.

The control device 9 may further include an abnormality detecting operation timer 38 configured to send a command which causes the abnormality detecting operation control module 36*b* to execute an abnormality detecting operation to activate or operate the electric actuator 2, to the abnormality detecting operation control module 36*b* at a given time interval, in a case where traveling of the vehicle in the absence of the operation of the brake application device 40 for a given period of time is continued. The abnormality detecting operation control module 36*b* may activate the electric actuator 2 in accordance with the command from the abnormality detecting operation timer 38.

According to the above configuration, the abnormality detecting operation timer 38 may obtain information regarding the driving state of the electric brake device on the basis of the rotation angle of the electric actuator 2, the generated torque, or the like, and may measure the time from when the electric brake device operated last time. The abnormality detecting operation timer 38 may generate an abnormality detecting operation trigger when the measured time exceeds a given time. Upon detecting occurrence of the abnormality detecting operation trigger, the abnormality detecting operation control module 36*b* executes the abnormality detecting operation to operate the electric actuator 2. Since the abnormality detecting operation can be automatically executed without requiring an operation by an operator, an operation burden on the operator can be reduced.

The control device 9 may further include an abnormality detecting operation command input module 39 configured to send a command which causes the abnormality detecting operation control module 36*b* to execute an abnormality detecting operation to activate or operate the electric actuator 2, to the abnormality detecting operation control module 36*b* in response to an input performed by the operator through an input operation device. Thus, the abnormality detecting operation can be executed at any timing by the operator.

The command sent to the abnormality detecting operation command input module 39 may be generated by an externally connected device 35 which is connected outside the control device 9. The externally connected device is, for example, a vehicle integrated control device 35 which is high-order control unit of the control device 9.

The abnormality detecting operation control module 36*b* may activate or operate the electric actuator 2 so that the abnormality detection module 37 may detect presence/absence of abnormality in the electric brake device while the pressing member 7 has no contact with the brake rotor 6. Thus, it is possible to promptly detect presence/absence of abnormality in the electric brake device in the stage prior to bringing the pressing member 7 into contact with the brake rotor 6.

If no abnormality is detected while the pressing member 7 has no contact with the brake rotor 6, the abnormality detecting operation control module 36*b* may activate or operate the electric actuator 2 so that the abnormality detection module 37 may detect presence/absence of abnormality in the electric brake device, with the pressing member 7 being in light contact with the brake rotor 6. Even in the case where no abnormality is detected in the electric brake device with the pressing member 7 being not in contact with the brake rotor 6, when presence/absence of abnormality in the electric brake device can be detected with the pressing member 7 being in light contact with the brake rotor 6, and thus accuracy in detecting presence/absence of abnormality in the electric brake device can be enhanced.

While a gap between the brake rotor 6 and the pressing member 7 is increased and/or decreased by the abnormality detecting operation control module 36*b*, the abnormality detection module 37 may determine whether or not a difference between a set value for comparison and a correlation value indicating correlation of at least two of a voltage applied to the electric actuator 2, a current in the electric actuator 2, and a rotation angle of the electric actuator 2, is within an allowable range, so that the abnormality detection module confirms whether or not the electric brake device normally operates.

The "set value for comparison" is determined through a test, a simulation, or the like, for example.

Thus, when the abnormality detection module 37 determines that the difference between the set value for comparison and the correlation value indicating correlation of at least two of the applied voltage, the current, and the rotation angle, is within the allowable range, the abnormality detection module 37 can confirm that the electric actuator 2 operates as commanded.

The electric brake device may further include a braking force detection device 44 configured to detect a braking force generated when the pressing member 7 is pressed against the brake rotor 6. While the abnormality detecting operation control module 36*b* causes the pressing member 7 to be in light contact with the brake rotor 6, the abnormality detection module 37 may compare a braking force estimated from at least one of the voltage applied to the electric actuator 2, the current in the electric actuator 2, and the rotation angle of the electric actuator 2, with the braking force detected by the braking force detection device 44 to determine whether or not a difference of these braking forces is within a set allowable range, so that the abnormality detection module confirms whether or not the electric brake device normally operates.

The degree of the "light contact" is, for example, a degree which allows clear determination that a change in an output of a pressing force detecting sensor included in the electric brake device is not caused by noise but caused by a pressing force.

If the abnormality detection module 37 determines that the difference between the estimated braking force and the braking force detected by the braking force detection device 44 is within the set allowable range, the abnormality detection module 37 detects that the electric brake device normally operates.

The electric brake device may include an abnormality occurrence information notifying device 34 configured to, when the abnormality detection module 37 detects abnormality of the electric brake device, notify either or both of the driver and an external device communicating with the control device 9 of information about occurrence of the abnormality. The abnormality occurrence information notifying device 34 is, for example, a display device such as an in-vehicle display device provided on a console panel of the vehicle.

Thus, the driver can early recognize the information about occurrence of the abnormality and take an appropriate countermeasure.

When the operation of an accelerator of the vehicle by the driver is released and the vehicle shifts to deceleration, the abnormality detecting operation control module 36*b* may bring the pressing member 7 into light contact with the brake rotor 6. Generally, when the pressing member 7 is brought into light contact with the brake rotor 6, slight deceleration would occur, which may make a passenger in the vehicle feel uncomfortable.

In the case where the pressing member 7 is brought into light contact with the brake rotor 6 at the timing when operation of the accelerator of the vehicle is released, this timing overlaps with the timing at which speed reduction occurs due to deceleration caused by travel resistance or deceleration caused by engine braking or equivalent regenerative braking, whereby the passenger is less likely to feel particular discomfort due to the abnormality detecting operation.

According to this configuration, since the pressing member 7 is brought into light contact with the brake rotor 6 when operation of the accelerator of the vehicle is released and the vehicle shifts to deceleration, the passenger in the vehicle is less likely to feel particular discomfort due to the abnormality detecting operation.

The braking force exerted by the light contact may cause a deceleration equal to or less than a certain ratio with respect to a deceleration due to a travel resistance of the vehicle. For example, when the running speed of the vehicle is high, the travel resistance is large, and the passenger is relatively less likely to feel uncomfortable. Therefore, when the braking force exerted by the light contact is set to be a braking force that causes a deceleration equal to or less than a certain ratio (e.g., 10%) with respect to the deceleration due to the travel resistance, the passenger in the vehicle is less likely to feel uncomfortable due to the abnormality detecting operation.

In the state where a request for abnormality detecting operation for the electric brake device is generated, the above-mentioned light contact may be executed when an acceleration equal to or higher than a certain level occurs in the vehicle, and a braking force exerted by the light contact may generate a deceleration equal to or less than a certain ratio with respect to the acceleration. In this case, for example, when the vehicle is accelerated with the accelerator being intensely pressed, the light contact operation of the pressing member 7 is executed such that a deceleration extremely smaller (e.g., about 1%) than the accelerating force is generated. Thus, the passenger in the vehicle is less likely to feel uncomfortable due to the abnormality detecting operation.

When the above-mentioned light contact is executed, if the detected braking force has a deviation from the estimated value within a range of accuracy assured by each detection mechanism, the detection result of the detection mechanism may be compensated for to improve the control accuracy in the next and subsequent executions of braking. For example, the characteristics of the detection mechanism may be varied with the temperature, and the relationship between the rotation angle of the electric actuator 2 and the actually generated pressing force or the braking force is apparently changed. Therefore, if the relationship fails to hold within the range of accuracy assured by the detection mechanism, the detection result of the detection mechanism is compensated for on the basis of the estimated value and the detected braking force, whereby the control accuracy in the next and subsequent executions of braking can be improved.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

The present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views and:

DESCRIPTION OF EMBODIMENTS

Figure 1:
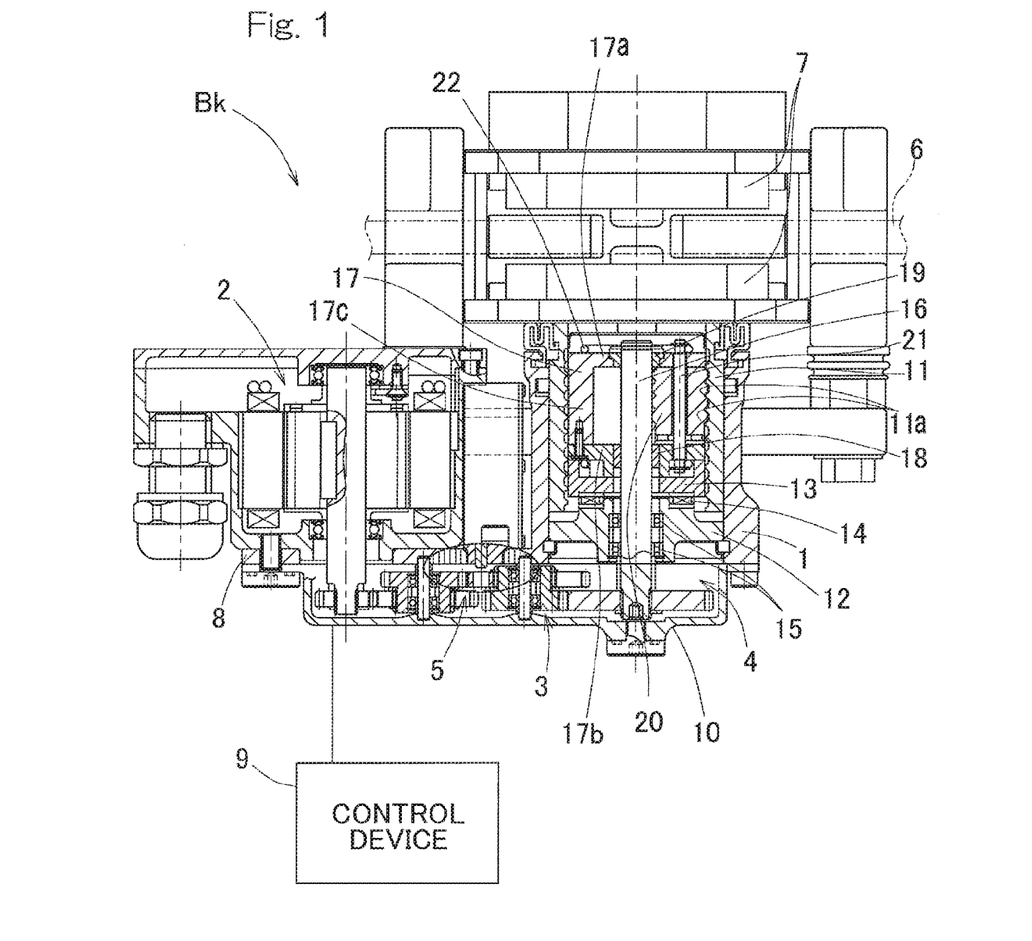
FIG. 1 is a cross-sectional view of an electric brake device according to first and second embodiments of the present invention.

An electric brake device according to a first embodiment of the present invention will be described with reference to FIGS. 1 to 6. The electric brake device according to this embodiment is a disc brake, for example. However, the electric brake device is not limited to the disc brake, and may be a drum brake. As shown in FIG. 1, the electric brake device includes a brake mechanism Bk and a control device 9.

First, the brake mechanism Bk will be described.

The brake mechanism Bk includes: a housing 1; an electric motor 2 as an electric actuator; a speed reduction mechanism 3 for reducing the speed of rotation of the electric motor 2; a linear motion mechanism 4; a locking mechanism 5; a brake rotor 6; and a brake pad 7 as a pressing member. A base plate 8 is provided at an opening end of the housing 1 so as to extend radially outward, and the electric motor 2 is supported by the base plate 8. The linear motion mechanism 4 is incorporated into the housing 1 so as to apply a braking force to the brake rotor 6, in this example, to a disc rotor, by output from the electric motor 2. The opening end of the housing 1 and an outer side surface of the base plate 8 are covered by a cover 10.

The linear motion mechanism 4 will be described.

The linear motion mechanism 4 is a mechanism that converts a rotary motion outputted from the speed reduction mechanism 3 into linear motion, and brings the brake pad 7 into contact with the brake rotor 6 or separates the brake pad 7 from the brake rotor 6. The linear motion mechanism 4 includes a slide member 11, a bearing member 12, an annular thrust plate 13, a thrust bearing 14, rolling bearings 15, 15, a rotation shaft 16, a carrier 17, and slide bearings 18, 19. The cylindrical slide member 11 is supported on the inner circumferential surface of the housing 1 such that the slide member 11 is prevented from rotating and is movable in the axial direction. On the inner circumferential surface of the slide member 11, a helical projection 11a is helically formed so as to project by a given distance in the radially inward direction. A plurality of planetary rollers 20 described below mesh with the helical projection 11a.

The bearing member 12 is provided at one end side, in the axial direction, of the slide member 11 in the housing 1. The bearing member 12 includes: a flange portion that extends radially outward; and a boss portion. The rolling bearings 15, 15 are fitted to the boss portion, and the rotation shaft 16 is fitted onto the inner diameter surface of an inner ring of each of the bearings 15, 15. Therefore, the rotation shaft 16 is rotatably supported by the bearing member 12 through the bearings 15, 15.

The carrier 17 is provided on the inner circumference of the slide member 11 so as to be rotatable about the rotation shaft 16. The carrier 17 has disks 17a and 17b that oppose each other in the axial direction. The disk 17b closer to the bearing member 12 may be referred to as an inner disk 17b, and the disk 17a may be referred to as an outer disk 17a. A distance adjustment member 17c is provided, in the disk 17a that is one of the disks, on the side surface opposing the disk 17b that is the other disk, so as to project in the axial direction from the outer circumferential edge portion of the side surface. A plurality of the distance adjustment members 17c are arranged so as to be spaced from each other in the circumferential direction such that respective distances between the plurality of planetary rollers 20 are adjusted. Both the disks 17a and 17b are integrated with each other through the distance adjustment members 17c.

The inner disk 17b is rotatably supported by the slide bearing 18 that is fitted between the inner disk 17b and the rotation shaft 16. The outer disk 17a has a shaft insertion hole formed at the center thereof, and the slide bearing 19 is fitted into the shaft insertion hole. The outer disk 17a is rotatably supported through the slide bearing 19 by the rotation shaft 16. A washer for receiving thrust load is fitted to the end portion of the rotation shaft 16, and a retaining ring that prevents the washer from being removed is provided.

The carrier 17 has a plurality of roller shafts 21 spaced from each other in the circumferential direction. Both end portions of each roller shaft 21 are supported by and between the disks 17a and 17b. That is, each of the disks 17a and 17b has a plurality of shaft insertion holes that are formed as long holes, respectively, and both the end portions of each roller shaft 21 are inserted into the corresponding shaft insertion holes, whereby the roller shafts 21 are supported so as to be movable in the radial direction. An elastic ring 22 is extended over the plurality of roller shafts 21 so as to urge the roller shafts 21 in the radially inward direction.

The planetary rollers 20 are rotatably supported by the roller shafts 21, respectively, and each planetary roller 20 is disposed between the outer circumferential surface of the rotation shaft 16 and the inner circumferential surface of the slide member 11. Each planetary roller 20 is pressed against the outer circumferential surface of the rotation shaft 16 by urging force of the elastic ring 22 extended over the plurality of roller shafts 21. By rotation of the rotation shaft 16, each planetary roller 20 that is in contact with the outer circumferential surface of the rotation shaft 16 rotates due to contact friction. On the outer circumferential surface of each planetary roller 20, a helical groove is formed so as to mesh with the helical projection 11a of the slide member 11.

A washer and a thrust bearing (both of which are not shown) are disposed between the inner disk 17b of the carrier 17 and one end portion, in the axial direction, of each planetary roller 20. In the housing 1, the annular thrust plate 13 and the thrust bearing 14 are disposed between the inner disk 17b and the bearing member 12.

The speed reduction mechanism 3 will be described.

Figure 2:
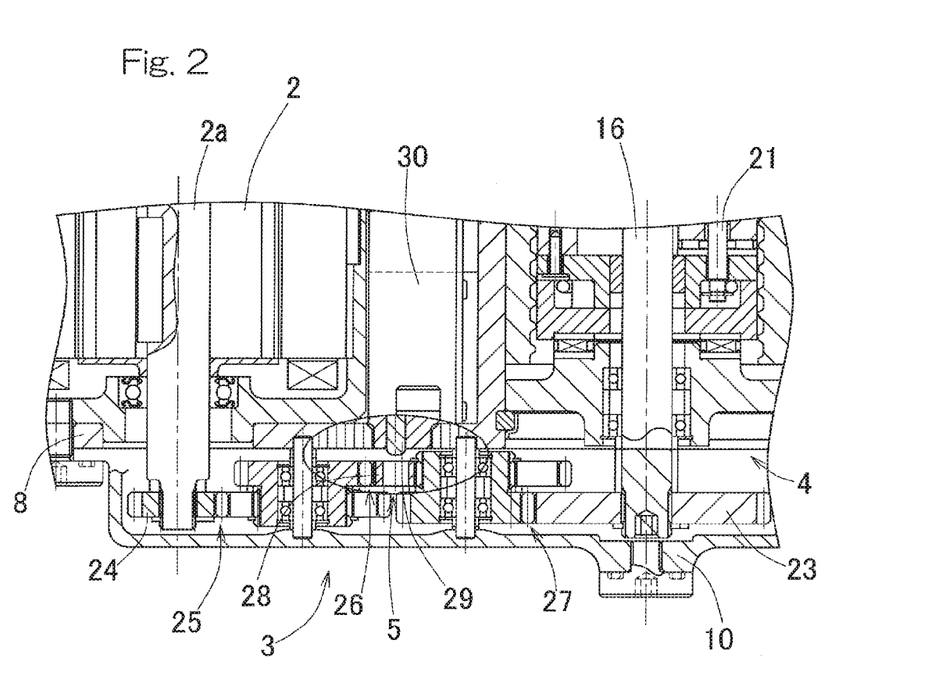
FIG. 2 is an enlarged cross-sectional view of a speed reduction mechanism of the electric brake device shown in FIG. 1.

As shown in FIG. 2, the speed reduction mechanism 3 is a mechanism that reduces the speed of rotation of the electric motor 2 and transmits the rotation to an output gear 23 fixed to the rotation shaft 16, and the speed reduction mechanism 3 includes a plurality of gear trains. In this example, the speed reduction mechanism 3 sequentially reduces, by gear trains 25, 26, and 27, the speed of rotation of an input gear 24 mounted to a rotor shaft 2a of the electric motor 2, and allows the rotation to be transmitted to the output gear 23 fixed to the end portion of the rotation shaft 16.

The locking mechanism 5 will be described.

The locking mechanism 5 is configured to switch between: a locking state in which a braking force reducing operation of the linear motion mechanism 4 is inhibited; and an unlocking state in which the braking force reducing operation is allowed. The locking mechanism 5 is provided in the speed reduction mechanism 3. The locking mechanism 5 includes: a casing (not shown); a lock pin 29; urging means (not shown) that urges the lock pin 29 so as to be in the unlocking state; and a linear solenoid 30 that acts as an actuator for driving switching of the lock pin 29. The casing is supported by the base plate 8, and the base plate 8 has a pin hole through which the lock pin 29 is allowed to move forward and backward.

The locking state is obtained when the lock pin 29 is moved forward by the linear solenoid 30, and engaged into a locking hole (not shown) formed in an intermediate gear 28 on the output side of the gear train 26, thereby to prevent rotation of the intermediate gear 28. When the linear solenoid 30 is turned off, the lock pin 29 is retracted into the casing so as to be removed from the locking hole by urging force from the urging means, to allow rotation of the intermediate gear 28, whereby the locking mechanism 5 enters the unlocking state.

The control device 9 and other elements will be described.

Figure 3:
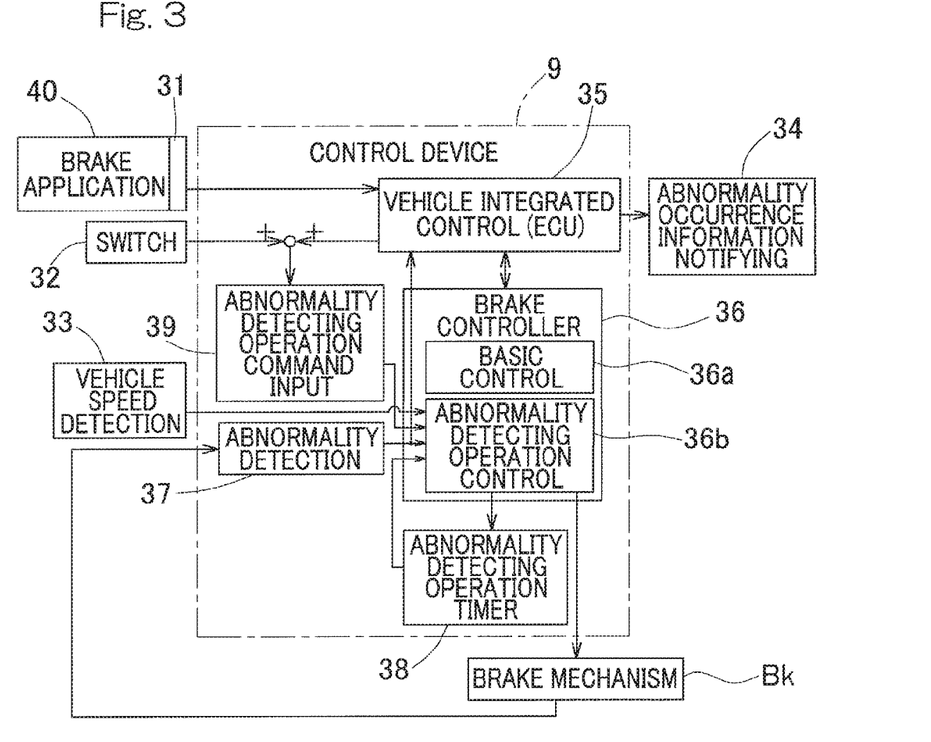
FIG. 3 is a block diagram illustrating a control system of the electric brake device shown in FIG. 1.

FIG. 3 is a block diagram illustrating a control system of the electric brake device. A vehicle having the brake mechanism Bk (FIG. 1) mounted therein includes the control device 9, a sensor 31, a switch (an input operation device) 32, a vehicle speed detection device 33, and an abnormality occurrence information notifying device 34. The control device 9 includes a vehicle integrated control device 35, a brake controller 36, an abnormality detection module 37, an abnormality detecting operation timer 38, and an abnormality detecting operation command input module 39. The vehicle integrated control device 35 is an electric control unit (ECU) that performs general control of the entire vehicle, and is a high-order or master control unit that provides commands to the brake controller 36 and the like. This vehicle integrated control device 35 includes a computer, a program executed by the computer, and an electronic circuit.

The vehicle integrated control device 35 generates a speed reduction command in accordance with an output, from the sensor 31, which depends on an amount of an operation performed on a brake application device 40 by a driver, and outputs the speed reduction command to the brake controller 36. The brake controller 36 includes a basic control module 36a and an abnormality detecting operation control module 36b. The basic control module 36a in the brake controller 36 sends a braking command to each brake mechanism Bk (FIG. 1) in accordance with the speed reduction command from the vehicle integrated control device 35. The basic control module 36a operates the electric motor 2 of each brake mechanism Bk in response to an operation performed on the brake application device 40 by the driver, and presses the brake pad 7 against the brake rotor 6 to apply a braking force (FIG. 1).

The abnormality detecting operation control module 36b operates the electric motor 2 of each brake mechanism Bk in accordance with a predetermined condition, independently of the brake manipulation by the driver, is, during the traveling of the vehicle in the absence of the operation of the brake application device 40. Whether or not the vehicle is traveling is determined as follows. For example, when a vehicle speed equal to or higher than a certain vehicle speed (e.g., 40 km/h) is detected by the vehicle speed detection device 33, the abnormality detecting operation control module 36b determines that the vehicle is traveling. The abnormality detecting operation control module 36b may be provided as a part of a function of the basic control module 36a.

Figure 4:
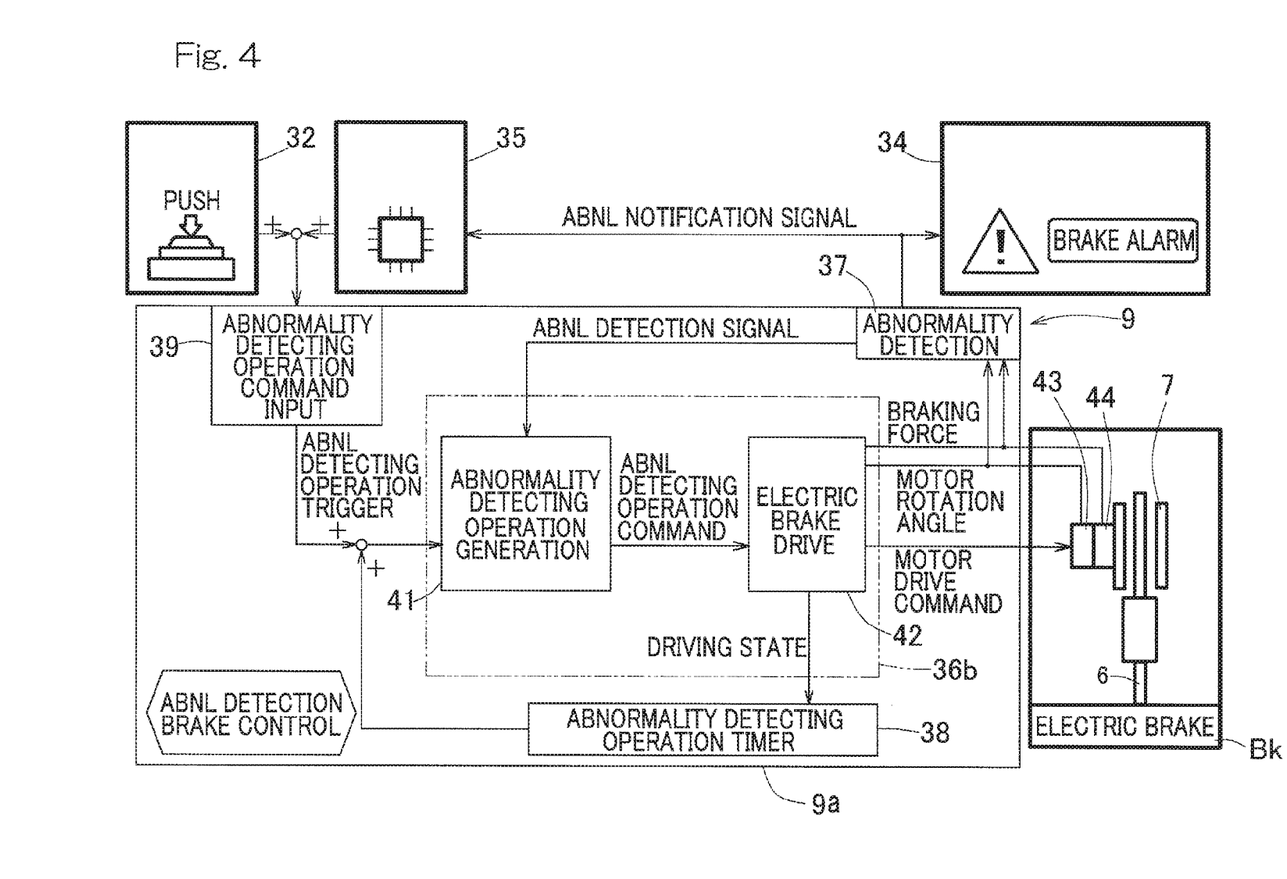
FIG. 4 is a block diagram illustrating a main part of a control device of the electric brake device shown in FIG. 1.

FIG. 4 is a block diagram showing an abnormality detection brake control module 9a and other elements of the control device 9 of the electric brake device. In the control device 9, the abnormality detection brake control module 9a includes the abnormality detecting operation control module 36b, the abnormality detection module 37, the abnormality detecting operation timer 38, and the abnormality detecting operation command input module 39.

The abnormality detecting operation control module 36b includes an abnormality detecting operation generation section 41 and an electric brake drive section 42. Upon detecting occurrence of an abnormality detecting operation trigger described later, the abnormality detecting operation generation section 41 sends, to the electric brake drive section 42, an abnormality detecting operation command to increase or decrease a gap between the brake rotor 6 and the brake pad 7. In accordance with the abnormality detecting operation command, the electric brake drive section 42 causes the electric motor 2 to rotate.

The abnormality detection module 37 obtains a measured value of a predetermined item related to the vehicle, when the electric motor 2 is caused to rotate by the abnormality detecting operation control module 36b, and compares the measured value with an estimated value or a set value to detect presence/absence of abnormality in the electric brake device. The "measured value of a predetermined item related to the vehicle" is, for example, an actual pressing force of the brake pad 7 when the electric motor 2 is rotated. The "estimated value" or the "set value" is, for example, a pressing force of the brake pad 7 estimated from a motor rotation angle, a generated torque calculated based on a motor current, and the like, when the electric motor 2 is rotated.

When the electric brake drive section 42 causes the electric motor 2 to rotate in accordance with the abnormality detecting operation command and increases or decreases the gap between the brake rotor 6 and the brake pad 7, the abnormality detection module 37 determines whether or not a difference between a set value for comparison and a correlation value indicating correlation of at least two of a voltage applied to the electric motor 2, the motor current, and the motor rotation angle, is within an allowable range, thereby confirming whether or not the electric brake device normally operates. Upon determining that the difference is within the allowable range, the abnormality detection module 37 determines that the electric brake device normally operates. The "set value for comparison" is predetermined through a test or a simulation, for example.

The abnormality detecting operation timer 38 receives a brake driving state from the electric brake drive section 42. This brake driving state is information obtained based on the actual pressing force of the brake pad 7, the motor rotation angle, and the generated torque, and the like. Based on the brake driving state, the abnormality detecting operation timer 38 generates an abnormality detecting operation trigger when traveling of the vehicle is continued without operating the brake application device 40 (FIG. 3) for a given period of time. This abnormality detecting operation trigger is detected by the abnormality detecting operation generation section 41. An abnormality detecting operation trigger is also generated by the abnormality detecting operation command input module 39 in response to an operation performed on the switch 32 by an operator. The abnormality detecting operation trigger generated in the input section 39 is also detected by the abnormality detecting operation generation section 41.

The abnormality occurrence information notifying device 34 is, for example, a display device such as an in-vehicle display device provided on a console panel of the vehicle. Upon receiving information about occurrence of abnormality in the electric brake device, which is outputted from the abnormality detection module 37, the vehicle integrated control device 35 causes the display device to display notification of the abnormality. Thus, the driver can early recognize the information about occurrence of the abnormality and take an appropriate countermeasure, such as moving the vehicle to a place where the vehicle does not obstruct the traffic of other vehicles and then stopping the vehicle.

It is assumed that, before abnormality detection is performed, the electric brake device is in the state where a usual braking operation by the basic control module 36a (FIG. 3) has been ended. In the state before abnormality detection, there is a slight gap between the brake rotor 6 and the brake pad 7 (hereinafter, this gap is referred to as "slight gap"). This slight gap has such a size that the electric motor 2 apparently needs to be rotated in order to bring the brake pad 7 into contact with the brake rotor 6, that is, the brake pad 7 does not accidentally come into contact with the brake rotor 6 due to vibration or the like.

Figure 5:
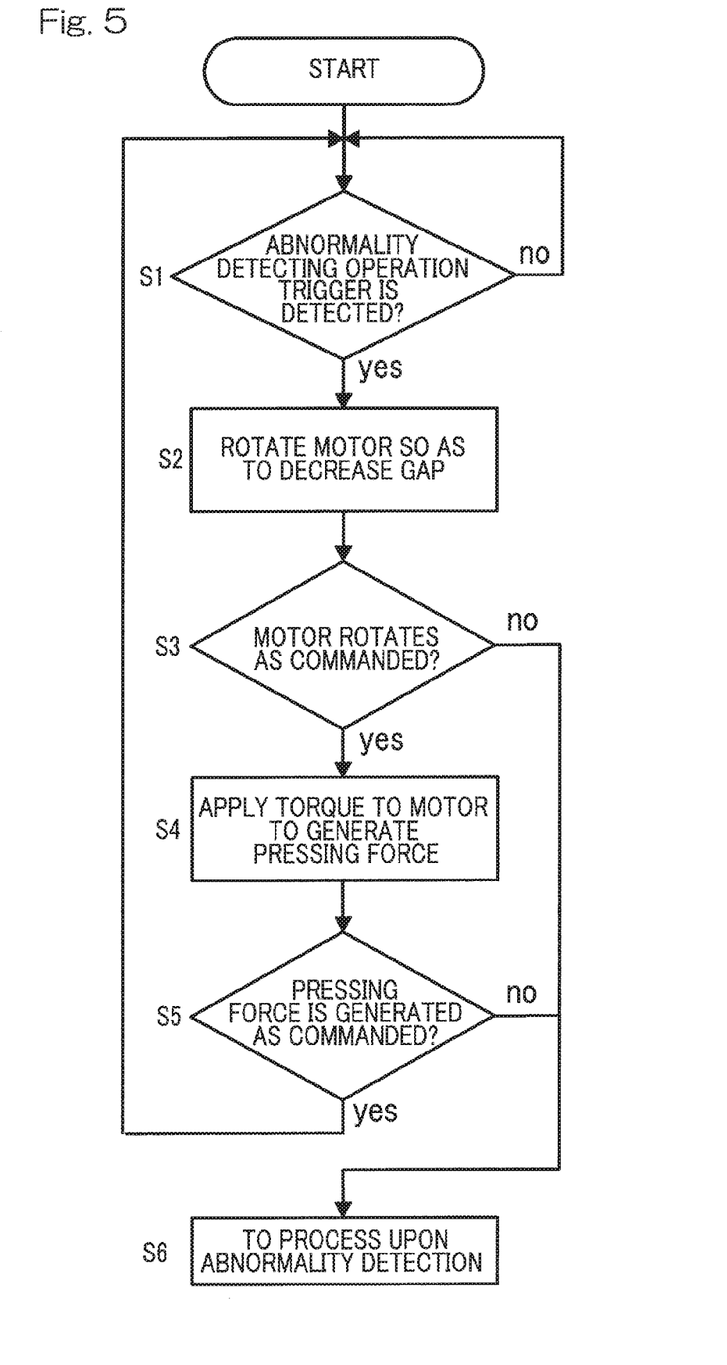
FIG. 5 is a flowchart for detecting presence/absence of abnormality in the electric brake device shown in FIG. 1.
Figure 6:
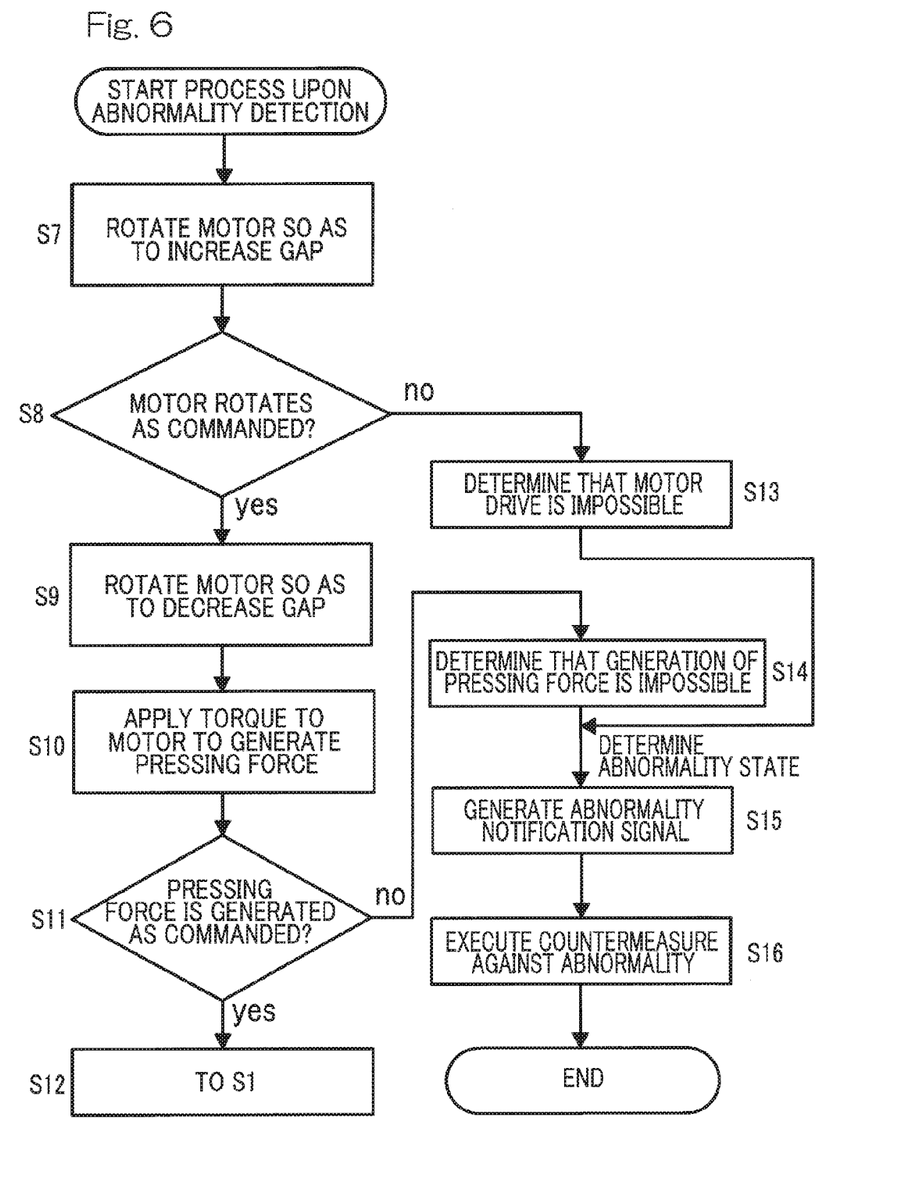
FIG. 6 is a flowchart in a case where abnormality is detected in the electric brake device.

FIG. 5 is a flowchart for detecting presence/absence of abnormality in the electric brake device, and FIG. 6 is a flowchart in a case where abnormality is detected in the electric brake device. FIG. 3 will be also referred to in association with FIG. 5 or FIG. 6. In this example, a simplest abnormality detection flow will be described for convenience. An abnormality detection method, a re-inspection method, the number of repeats, a step to which the flow returns when the result of determination after repeated detection operations is "normal", and the like are not limited to those shown in FIGS. 5 and 6.

As shown in FIG. 5, when the processing is started, the abnormality detecting operation timer 38 receives the brake driving state from the electric brake drive section 42, and measures the time from when the brake application device operated last time. After a given period of time has passed, an abnormality detecting operation trigger is generated. The given period of time is, for example, 10 minutes during which the brake is not activated by the brake application device, or 10 minutes during which the brake is not activated by the brake application device and the vehicle travels at a speed equal to or higher than a certain vehicle speed such as 40 km/h. Although not shown in the flowchart of FIG. 5, an abnormality detecting operation trigger may be generated in response to a switch input performed by the driver through the abnormality detecting operation command input module 39, or by a command from the vehicle integrated control device 35.

When the abnormality detecting operation generation section 41 detects the abnormality detecting operation trigger (yes in step S1), the abnormality detecting operation generation section 41 sends, to the electric brake drive section 42, a command to decrease the slight gap by causing the electric motor 2 to rotate (step S2). In this stage, the brake pad 7 has no contact with the brake rotor 6. At this time, the abnormality detection module 37 reads the motor rotation angle of the electric motor 2. Based on a change in the motor rotation angle at this time, the abnormality detection module 37 confirms that the electric motor 2 rotates as commanded (yes in step S3), and the process goes to step S4. If the abnormality detecting operation generation section 41 detects no abnormality detecting operation trigger in step S1 (no in step S1), the process returns to step S1 and waits until occurrence of an abnormality detecting operation trigger is detected.

In step S4, the abnormality detecting operation generation section 41 sends, to the electric brake drive section 42, a command to further cause the electric motor 2 to rotate or generate a torque, whereby a pressing force is generated in the brake pad 7, and the brake pad 7 is brought into light contact with the brake rotor 6. In step S2, the electric motor 2 may be rotated to an extent that the pressing force is generated. The abnormality detection module 37 compares a pressing force estimated from the motor rotation angle and the generated torque when the pressing force is generated, with the actually generated pressing force (step S5). If the pressing force is normal (yes in step S5), the process returns to step S1 and waits until occurrence of a next abnormality detecting operation trigger is detected.

If the abnormality detection module 37 determines in step S3 that the electric motor 2 fails to rotate as commanded (no in step S3), the process goes to a process upon abnormality detection (step S6). Likewise, also when the abnormality detection module 37 determines in step S5 that a pressing force fails to be generated as commanded (no in step S5), the process goes to the process upon abnormality detection (step S6). At this time, the abnormality detection module 37 sends an abnormality detection signal to the abnormality detecting operation generation section 41, whereby the abnormality detecting operation generation section 41 generates a command for the process upon abnormality detection.

As shown in FIG. 6, the abnormality detecting operation generation section 41 sends, to the electric brake drive section 42, a command to cause the electric motor 2 to rotate in the opposite direction and temporarily increase the slight gap (step S7). If the abnormality detection module 37 confirms, based on the motor rotation angle, that the electric motor 2 rotates as commanded (yes in step S8), the abnormality detecting operation generation section 41 sends, to the electric brake drive section 42, a command to cause the electric motor 2 to rotate in the forward direction and decrease the slight gap, whereby the electric motor 2 is rotated (step S9).

Next, the abnormality detecting operation generation section 41 sends, to the electric brake drive section 42, a command to further cause the electric motor 2 to rotate or generate a torque, whereby a pressing force is generated in the brake pad 7 and the brake pad 7 is brought into light contact with the brake rotor 6 (step S10). The abnormality detection module 37 compares the pressing force estimated from the motor rotation angle and the generated torque when the pressing force is generated, with the actually generated pressing force (step S11). If the pressing force is normal (yes in step S11), the abnormality detection module 37 determines that the latest abnormality determination is wrong (step S12), and the process returns to step S1 and waits until occurrence of an abnormality detecting operation trigger is detected.

Upon determining in step S8 that the electric motor 2 fails to rotate as commanded (no in step S8), it is determined that motor drive is impossible (step S13). At this time, the electric motor 2 cannot be rotated, or rotation of the electric motor 2 cannot be detected. This situation may be caused by, for example, adhesion of the electric motor 2, lock of the brake mechanism Bk, abnormality of a current drive element (not shown), abnormality of a motor rotation angle detection mechanism 43 that detects the motor rotation angle, or the like. If the current does not normally flow, abnormality of a current sensor, short-circuit of a motor coil, or the like is detected.

If the abnormality detection module 37 determines in step S11 that a pressing force fails to be generated as commanded (no in step S11), it is determined that generation of a pressing force is impossible (step S14). At this time, a pressing force of the brake pad 7 fails to be generated although the electric motor 2 rotates. This situation may be caused by idle running of the motor due to abnormality of the brake mechanism Bk, abnormality of a caliper, or the like. After presence of such abnormality is determined, the vehicle integrated control device 35 receives information indicating occurrence of the abnormality, which is outputted from the abnormality detection module 37, and causes the abnormality occurrence information notifying device 34 to notify the abnormality (step S15). Thereafter, a countermeasure against the abnormality, such as using a fail-safe mechanism or sharing the braking force, is executed (step S16). Thereafter, this processing is ended.

Advantageous effects will be described.

The abnormality detecting operation control module 36b operates the electric motor 2 as described above during the traveling of the vehicle in the absence of the operation of the brake application device 40. If the abnormality detection module 37 determines that the electric motor 2 fails to rotate as commanded or a pressing force fails to be generated as commanded, the abnormality detection module 37 detects abnormality of the electric brake device.

Thus, during the traveling of the vehicle in the absence of the operation of the brake application device 40 by the driver, it is possible to detect presence/absence of abnormality in the electric brake device. For example, under the situation that the vehicle travels without using the brake for a long period of time, such as driving on a highway, it is possible to early detect presence/absence of abnormality in the electric brake device. When abnormality of the electric brake device is detected, the driver can take an appropriate countermeasure, such as moving the vehicle to a place where the vehicle does not obstruct other vehicles and then stopping the vehicle.

The abnormality detecting operation timer 38 generates an abnormality detecting operation trigger, and the abnormality detecting operation control module 36b detects occurrence of the abnormality detecting operation trigger to execute the abnormality detecting operation which cause the electric motor 2 to rotate. Since the abnormality detecting operation can be automatically executed without requiring an operation by the driver, an operation burden on the operator can be reduced.

Alternatively, in response to a switch input performed by the driver, the abnormality detecting operation command input module 39 may instruct the abnormality detecting operation control module 36b to execute the abnormality detecting operation which cause the electric motor 2 to rotate. Thus, it is possible to execute the abnormality detecting operation at any timing by the driver.

A second embodiment will be described.

As shown in FIG. 4, the motor rotation angle detection mechanism 43 is provided with a braking force detection device 44 that detects a braking force applied when the brake pad 7 is pressed against the brake rotor 6. When the brake pad 7 is brought into light contact with the brake rotor 6 by the abnormality detecting operation control module 36b, the abnormality detection module 37 may compare the braking force estimated from at least one of the voltage applied to the electric motor 2, the motor current, and the motor rotation angle, with the braking force detected by the braking force detection device 44, and may determine whether or not a difference between these braking forces is within the set allowable range, thereby confirming whether or not the electric brake device normally operates.

Upon determining that the difference between the estimated braking force and the braking force detected by the braking force detection device 44 is within the set allowable range, the abnormality detection module 37 detects that the electric brake device normally operates.

When operation of the accelerator of the vehicle by the driver is released and thereby the vehicle shift to deceleration, the abnormality detecting operation control module 36b may bring the brake pad 7 into light contact with the brake rotor 6. When the brake pad 7 is brought into light contact with the brake rotor 6, slight deceleration would occur, which may make a passenger of the vehicle feel uncomfortable.

In the case where the brake pad 7 is brought into light contact with the brake rotor 6 at the timing when operation of the accelerator of the vehicle is released, this timing overlaps with the timing at which speed reduction occurs due to deceleration caused by travel resistance or deceleration caused by engine braking or equivalent regenerative braking, whereby the passenger is less likely to feel particular discomfort due to the abnormality detecting operation.

According to this configuration, since the brake pad 7 is brought into light contact with the brake rotor 6 when operation of the accelerator of the vehicle is released and the vehicle shifts to deceleration, the passenger in the vehicle is less likely to feel particular discomfort due to the abnormality detecting operation.

The braking force exerted by the light contact may cause a deceleration equal to or less than a certain ratio with respect to a deceleration due to the travel resistance of the vehicle. For example, when the running speed of the vehicle is high, the travel resistance is large, and thus the passenger is relatively less likely to feel uncomfortable. Therefore, when the braking force exerted by the light contact is set to be a braking force that causes a deceleration equal to or less than a certain ratio (e.g., 10%) with respect to the deceleration due to the travel resistance, the passenger in the vehicle is less likely to feel uncomfortable due to the abnormality detecting operation.

In the state where a request for abnormality detecting operation for the electric brake device is generated, the above-mentioned light contact may be executed when an acceleration equal to or higher than a certain level occurs in the vehicle, and a braking force exerted by the light contact may have a magnitude that causes a deceleration equal to or less than a certain ratio with respect to the acceleration. In this case, for example, while the vehicle is accelerated with the accelerator being intensely pressed, the light contact operation of brake pad 7 is executed such that a deceleration extremely smaller (e.g., about 1%) than the accelerating force is generated. Thus, the passenger in the vehicle is less likely to feel uncomfortable due to the abnormality detecting operation.

The above-described series of abnormality detections may be performed, after a given period of time has passed from when the electric brake device operated last time, on the four wheels of the vehicle simultaneously, or one by one in order, for example. For example, the series of abnormality detections may be executed on one wheel in 10 minutes so as to be completed on four wheels in 40 minutes.

In the above description, the method for detecting a pressing force has been exemplified. However, a mechanism for directly measuring a braking force that occurs in a tire, e.g., a tire rotation axial force sensor, or a mechanism for measuring a deceleration that occurs in a vehicle, e.g., a vehicle acceleration sensor, may be used.

REFERENCE NUMERALS

2 . . . electric motor (electric actuator)
6 . . . brake rotor
7 . . . brake pad (pressing member)
9 . . . control device
36a . . . basic control module
36b . . . abnormality detecting operation control module
37 . . . abnormality detection module
40 . . . brake application device

What is claimed is:

1. An electric brake device comprising:
a brake rotor;
a pressing member;
an electric actuator configured to press the pressing member against the brake rotor; and
a controller configured to control the electric actuator,
wherein the controller includes:
a basic control module configured to activate the electric actuator in response to an operation performed on a brake application device by a driver, so that the pressing member is pressed against the brake rotor to apply a braking force to the brake rotor;
an abnormality detecting operation timer;
an abnormality detecting operation control module configured to activate the electric actuator at a given time from the last operation of the brake application device during the traveling of a vehicle during the absence of the operation of the brake application device; and
an abnormality detection module configured to obtain a measured value of a predetermined item related to the vehicle when the electric actuator is activated by the abnormality detecting operation control module, and to compare the measured value with an estimated value or a set value to detect presence/absence of abnormality in the electric brake device.

2. The electric brake device as claimed in claim 1, wherein the controller further includes:
an abnormality detecting operation command input module configured to send a command which causes the abnormality detecting operation control module to execute an abnormality detecting operation to activate the electric actuator, to the abnormality detecting operation control module in response to an input performed by an operator through an input operation device.

3. The electric brake device as claimed in claim 2, wherein the command sent to the abnormality detecting operation command input module is generated by an vehicle controller which is connected outside the controller.

4. The electric brake device as claimed in claim 1, wherein the abnormality detecting operation control module is configured to activate the electric actuator so that the abnormality detection module detects presence/absence of abnormality in the electric brake device while the pressing member has no contact with the brake rotor.

5. The electric brake device as claimed in claim 4, wherein, if no abnormality is detected while the pressing member has no contact with the brake rotor, the abnormality detecting operation control module is configured to activate the electric actuator so that the abnormality detection module detects presence/absence of abnormality in the electric brake device, with the pressing member being in light contact with the brake rotor.

6. The electric brake device as claimed in claim 1, wherein, while a gap between the brake rotor and the pressing member is increased and/or decreased by the abnormality detecting operation control module, the abnormality detection module is configured to determine whether or not a difference between a set value for comparison and a correlation value indicating correlation of at least two of a voltage applied to the electric actuator, a current in the electric actuator, and a rotation angle of the electric actuator, is within an allowable range, so that the abnormality detection module confirms whether or not the electric brake device normally operates.

7. The electric brake device as claimed in claim 1, further comprising:
a braking force detection device configured to detect a braking force generated when the pressing member is pressed against the brake rotor,
wherein while the abnormality detecting operation control module causes the pressing member to be in light contact with the brake rotor, the abnormality detection module is configured to compare a braking force estimated from at least one of the voltage applied to the electric actuator, the current in the electric actuator, and the rotation angle of the electric actuator, with the braking force detected by the braking force detection device to determines whether or not a difference of these braking forces is within a set allowable range, so that the abnormality detection module confirms whether or not the electric brake device normally operates.

8. The electric brake device as claimed in claim 7, wherein, when the operation of an accelerator of the vehicle by the driver is released and the vehicle shifts to deceleration, the abnormality detecting operation control module is configured to bring the pressing member into light contact with the brake rotor.

9. The electric brake device as claimed in claim 7, wherein the braking force exerted by the light contact causes a deceleration equal to or less than a certain ratio with respect to a deceleration due to a travel resistance of the vehicle.

10. The electric brake device as claimed in claim 7, wherein, when an acceleration equal to or higher than a certain level is generated in the vehicle, the abnormality detecting operation control module is configured to bring the pressing member into light contact with the brake rotor, and a braking force exerted by the light contact generates a deceleration equal to or less than a certain ratio with respect to the acceleration.

11. An electric brake device comprising:
a brake rotor;
a pressing member;
an electric actuator configured to press the pressing member against the brake rotor; and
a controller configured to control the electric actuator,
wherein the controller includes an abnormality detecting operation timer and memory storing instructions
to activate the electric actuator in response to an operation performed on a brake application device by a driver, so that the pressing member is pressed against the brake rotor to apply a braking force to the brake rotor;
to activate the electric actuator at a given time from the last operation of the brake application device during the traveling of a vehicle during the absence of the operation of the brake application device; and
to obtain a measured value of a predetermined item related to the vehicle when the electric actuator is activated by the abnormality detecting operation control module, and to compare the measured value with an estimated value or a set value to detect presence/absence of abnormality in the electric brake device.

* * * * *